United States Patent [19]

Kumaki et al.

[11] Patent Number: 5,023,211

[45] Date of Patent: Jun. 11, 1991

[54] SUPER-HARD CERAMICS

[75] Inventors: Akihico Kumaki; Yoshito Izumi, both of Tokyo, Japan

[73] Assignee: Onoda Cement Co., Ltd., Onoda, Japan

[21] Appl. No.: 570,346

[22] Filed: Aug. 21, 1990

[30] Foreign Application Priority Data

Oct. 11, 1989 [JP] Japan ................................. 1-264687

[51] Int. Cl.$^5$ ...................... C04B 35/56; C04B 35/10; C04B 35/50
[52] U.S. Cl. ...................................................... 501/87
[58] Field of Search .......................................... 501/87

[56] References Cited

U.S. PATENT DOCUMENTS

| | | | |
|---|---|---|---|
| 4,251,841 | 2/1981 | Jacobs | 501/87 |
| 4,416,840 | 11/1983 | Lee et al. | 501/87 |
| 4,528,121 | 7/1985 | Matsushita et al. | 501/87 |
| 4,543,343 | 9/1985 | Iyori et al. | 501/87 |
| 4,650,774 | 3/1987 | Kawaguchi et al. | 501/87 |
| 4,839,315 | 6/1989 | Suzuki et al. | 501/87 |

*Primary Examiner*—Mark L. Bell
*Attorney, Agent, or Firm*—Oblon, Spivak, McClelland, Maier & Neustadt

[57] ABSTRACT

A super-hard ceramic comprising 15–45% by weight of a mixture of titanium carbide and zirconium carbide at a ratio by weight of 1/0.05–1/0.40; 0.1–1.0% by weight of magnesium oxide; 0.05–0.5% by weight of lithium oxide; 0.2–1.0% by weight of neodymium oxide; and 52.5–84.65% by weight of alumina is disclosed. A process for preparing the super-hard ceramics is also disclosed. The super-hard ceramics of the present invention have high strength and high hardness as well as excellent toughness and resistance to chipping. Said ceramics can be used for cutting materials for which conventional alumina ceramics have been difficult to use, and are applicable to wear-resistant materials or electrical components which require high precision machining.

2 Claims, No Drawings

SUPER-HARD CERAMICS

BACKGROUND OF THE INVENTION

1. Field of the Invention

The present invention relates to a super-hard ceramic and, more particularly, to a ceramic which has super-hardness, excellent wear resistance, high toughness and chipping resistance, and which can be used as a material for cutting tools and workpieces to be machined, or parts for high precision machining, and the like.

2. Description of the Background Art

Conventionally, alumina ceramics have widely been used as wear-resistant materials, sealing materials, machine parts, and the like, because they possess high hardness, excellent resistance to oxidation, and outstanding wear resistance, and can be produced at a relatively low cost. However, they essentially lack toughness and strength, and have the drawbacks of being apt to grow grains and to have numerous pores form in their structures. This entails a substantial limitation to their use because of brittleness, comparatively low strength and low working accuracy, and they can rarely be used as materials for cutting tools and workpieces to be machined, or parts for high precision machining, and the like.

In order to eliminate these drawbacks, some attempts have been undertaken to improve the sintered structure of alumina ceramics by adding grain-growth inhibitors or by means of hot pressing. However, these means have almost no effect in overcoming the problem of brittleness or in improving toughness.

On the other hand, a dispersed-reinforced alumina ceramic was prepared by dispersing and combining in the alumina matrix a metal carbide such as titanium carbide possessing elasticity, hardness, and strength which is equivalent to or better than alumina and capable of coexisting with alumina. Such a reinforced-alumina ceramic could provide significant improvements in strength, toughness, and grain-growth inhibitory effect over conventional alumina ceramics, and could be applied to high performance cutting tools, materials for excellent wear-resistant parts, or non-magnetic electric components particularly for magnetic heads, and the like.

However, these dispersed-reinforced alumina ceramics have problems still to be improved. Specifically, it is difficult to sinter these types of ceramics in air because titanium carbide will be oxidized. While in vacuum or a non-oxidative atmosphere, they have a tendency to form pores due to the reducing reaction so that the densification of the ceramic will not proceed. To improve sinterability of the ceramics, an attempt was made to use conventional sintering additives. However, a great amount of additives is required for this purpose, and the resulting ceramics have properties which deviate from those originally intended. On the other hand, the use of a small amount of additives sometimes requires a reheat-treatment by means of hot isostatic pressing to densify the ceramics, and accordingly tends to cause grain growth. Although it is possible to sinter the ceramics with no grain-growth using the least amount of sintering additives when direct-sintering by high-pressing during heating is applied, the resulting titanium carbide-alumina ceramics are insufficient in toughness and in chipping resistance. Specifically, when a workpiece made of these ceramics is subjected to cutting or grinding, chipping is liable to occur and when these ceramics are adopted for a cutting tool, tool chips often fracture in a heavy cutting.

In view of this situation, the present inventors have conducted extensive studies in order to develop a super-hard ceramic having the superior properties inherent in titanium carbide-alumina ceramics which possess high hardness and excellent wear resistance, as well as superior toughness and chipping resistance.

As a result, the inventors have found that an alumina ceramic possessing excellent toughness and chipping resistance without accompanying grain growth, while retaining the characteristics inherent in alumina ceramics, could be obtained by incorporating neodymium oxide and lithium oxide in addition to alumina, titanium carbide, zirconium carbide, and magnesium oxide. This finding led to the completion of the present invention.

SUMMARY OF THE INVENTION

Accordingly, an object of the present invention is to provide a super-hard ceramic comprising 15-45% by weight of a mixture of titanium carbide and zirconium carbide at a ratio by weight of 1/0.05-1/0.40; 0.1-1.0% by weight of magnesium oxide; 0.05-0.5% by weight of lithium oxide; 0.2-1.0% by weight of neodymium oxide; and 52.5-84.65% by weight of alumina, also to provide a process for preparing the super-hard ceramics.

Other objects, features and advantages of the invention will hereinafter become more readily apparent from the following description.

DETAILED DESCRIPTION OF THE INVENTION

AND PREFERRED EMBODIMENTS

Alumina ($Al_2O_3$) used in the super-hard ceramics of the present invention constitutes the matrix of the ceramic. For the alumina, it is preferable to use the $\alpha$-alumina ($\alpha$-$Al_2O_3$) of high purity and small particle size. The amount be incorporated is 52.5-84.65% by weight.

Titanium carbide (TiC) is known to exhibit a high hardness when dispersed in the alumina matrix and functions to increase the strength of the ceramics.

Zirconium carbide (ZrC) is fundamentally one of the most difficult-sinterable compounds among the transition metal carbide family when used independently though it exhibits high hardness, good thermal conductivity, and high melting point. When incorporated in the ceramics of the present invention, it prevents the grain-growth of titanium carbide and to restrain the occurrence of chipping owing to its inherent nature. In addition, zirconium carbide partially forms a solid solution together with titanium carbide and carbides of IVa, Va, and VIa groups of the periodic table which have the same crystal symmetry, and has a function of holding these carbides in the alumina matrix without increasing grain growth.

The ratio by weight of titanium carbide and zirconium carbide formulated in the composition of this invention is in the range of 1/0.05 to 1/0.40. The effect is insufficient at a ratio of less than 0.05, while at a ratio exceeding 0.40, the ceramics become difficult to sinter. The ratio outside the above limited range is therefore unacceptable. The total amount of titanium carbide and zirconium carbide to be formulated is 15-45% by weight. Only insufficient effect is expected if the amount is less than 15% by weight, while an amount greater than 45% by weight tends to produce some aggregation of titanium carbide which cannot be held in the matrix, resulting in deterioration in the properties of the ceramics. Hence the above limited range is imperative.

Substitution of a part of zirconium carbide by one or more of metal carbides of IVa, Va, and VIa groups of the periodic table other than titanium carbide and zirconium carbide provides the same effect in the ceramics of the present invention. Examples of such carbides of IVa, Va, and VIa metals are VC, CrC, MoC, HfC, TaC, WC, NbC, and the like. These carbides of IVa, Va, and VIa metals can be incorporated in an amount which does not disturb the effect of the zirconium carbide added. A preferable amount of these carbides is less than 50% by weight of the zirconium carbide.

Magnesium oxide (MgO) has a function of preventing the unusual grain-growth by forming solid solution like a spinel or other phase around alumina particles. The amount of magnesium oxide to be incorporated is 0.1–1.0% by weight. If the amount is less than 0.1% by weight, only insufficient effect is obtained, while if the amount exceeds 1.0% by weight, the formation of magnesium oxide compounds and the solid solution increases and results in the deterioration of the mechanical properties of the product.

Neodymium oxide ($Nd_2O_3$) gives the driving force of sintering by a solid-state reaction at the interface of the alumina constituting a matrix, and significantly accelerates sintering. Neodymium oxide is incorporated in an amount of 0.2–1.0% by weight. At the amount of less than 0.2% by weight sufficient effect can not be expected, and the amount greater than 1.0% does not bring about the effect proportionate to the added amount.

The function of lithium oxide ($Li_2O$) in this invention has not been fully elucidated but is presumed as follows: Since the ceramic of the present invention is subject to sintering at a temperature around the melting point of lithium oxide, a part of lithium oxide form a liquid phase. The liquid phase of lithium oxide reaches the peripheries of titanium carbide which has entered into the alumina matrix, and reacts with alumina and titanium carbide respectively to form intermediate reaction products. These reaction products reacts each other and eventually produce a new phase. This new phase has a function of firmly combining the alumina with the titanium carbide, thus improving the resistance to chipping. Another part of the liquid lithium oxide reaches between particles of titanium carbide, and improves the sinterability among titanium carbide particles and between titanium carbide particles and other carbide particles. Still another part of lithium oxide enters into the alumina matrix and forms a solid solution having a crystal structure very similar to the α-alumina or forms a grain boundary phase having characteristics greatly different from alumina, thus providing the ceramics with high toughness against deflection of cracks and the like. The amount of lithium oxide to be incorporated is 0.05 to 0.5% by weight to obtain the above effects. If the amount is less than 0.05% by weight, desired effects can not be obtained, while if the amount exceeds 0.5% by weight, the formation of the grain boundary phase proceeds excessively so that the percentage of lithium oxide existing independently in the ceramics increases, resulting in the decrease in the strength of the ceramics.

It is preferable to produce the ceramics of the present invention by sintering the raw materials by means of pressing during heat. Examples of such pressing methods include a hot isostatic pressing (HIP) in which the raw materials are directly and isostatically pressed, and the hot pressing method. The hot pressing method is preferably used in order to densify a difficult sinterable material and to effectively repress the grain-growth in the structure. A preferable sintering temperature is in the range of from 1,500 to 1,850° C. At the temperature of lower than 1,500° C, sintering will not proceed, while at the temperature exceeding 1,850° C., excess sintering occurs and the overall grain-growth increases, resulting in the deterioration in the properties. It is desirable that the pressure is in the range of 200 to 500 Kgf/cm². If the pressure is less than 200 Kgf/cm², densification will be insufficient, while a pressure greater than 500 Kgf/cm² will not yield the effect proportionate to the increased pressure but also invites an excessive, undesirable loss of dies.

Other features of the invention will become apparent in the course of the following description of the exemplary embodiments which are given for illustration of the invention and are not intended to be limiting thereof.

EXAMPLE

Raw powders shown in Table 1, balls, and acetone were charged into a ball mill. The mixture was milled and mixed for 48 hours and then dried to obtain a raw composition. The raw composition was filled in a graphite mold and treated by a hot press wherein the raw composition was kept at 1,650° C. under 300 Kgf/cm², in vacuo, for 60 minutes. The target ceramics were thus obtained. As a raw alumina, that having an average particle size of 0.3–0.4 μm and a 99.9% purity was used. Other components were selected from the commercially available materials.

The ceramics obtained were evaluated according to the following methods.

(1) Bending strength

The 4-point bending strength was measured according to JIS R1601.

(2) Hardness

Vickers hardness at an indentation load of 10 Kgf and the Rockwell hardness on A-scale were measured.

(3) Fracture toughness

Critical stress intensity factor ($K_{1c}$) was measured according to the SENB (Single-Edge Notched-Beam) method.

(4) Average particle size of Matrix

An average particle size of the fractured surface after the 4-point bending strength test was measured using SEM image.

(5) Chipping resistance

The ceramics with a thickness of 5.0 mm was machined using a vitrified bonded diamond blade at 1,400 rpm (depth of cut: 30 μm). Chipping of the ceramics occurred at an accelerated feed speed. The minimum feed speed at which chipping occurred was determined. The results are given in Table 2.

TABLE 1

| Ceramics | Formulation (%) | | | | | | | | |
|---|---|---|---|---|---|---|---|---|---|
| | Al$_2$O$_3$ | TiC | ZrC | HfC | NbC | WC | MgO | Nd$_2$O$_3$ | Li$_2$O |
| Inventive Composition | | | | | | | | | |
| 1 | 69.4 | 27 | 2.75 | — | — | — | 0.3 | 0.5 | 0.05 |
| 2 | 69.6 | 27 | 2.8 | — | — | — | 0.3 | 0.2 | 0.1 |
| 3 | 69.5 | 27 | 2.8 | — | — | — | 0.1 | 0.5 | 0.1 |
| 4 | 54.1 | 42.86 | 2.14 | — | — | — | 0.3 | 0.5 | 0.1 |
| 5 | 54.1 | 34.6 | 10.4 | — | — | — | 0.3 | 0.5 | 0.1 |
| 6 | 69.4 | 24.8 | 3.5 | — | — | 1.4 | 0.3 | 0.5 | 0.1 |
| 7 | 69.4 | 24.8 | 2.45 | — | 2.45 | — | 0.3 | 0.5 | 0.1 |
| 8 | 69.4 | 27 | 2.5 | 0.2 | — | — | 0.3 | 0.5 | 0.1 |
| 9 | 69.4 | 24.9 | 1.4 | — | 1.0 | 0.4 | 0.3 | 0.5 | 0.1 |
| 10 | 69.4 | 24.8 | 4.9 | — | — | — | 0.3 | 0.5 | 0.1 |
| 11 | 84.1 | 11.53 | 3.47 | — | — | — | 0.3 | 0.5 | 0.1 |
| 12 | 84.1 | 14.2 | 0.8 | — | — | — | 0.3 | 0.5 | 0.1 |
| 13 | 69.2 | 26.8 | 2.7 | — | — | — | 0.3 | 0.5 | 0.5 |
| 14 | 69.0 | 27 | 2.6 | — | — | — | 0.3 | 1.0 | 0.1 |
| 15 | 68.9 | 26.9 | 2.6 | — | — | — | 1.0 | 0.5 | 0.1 |
| Comparative Composition | | | | | | | | | |
| 16 | 70.0 | 30 | — | — | — | — | — | — | — |
| 17 | 69.8 | 29.9 | — | — | — | — | 0.3 | — | — |
| 18 | 59.8 | 39.9 | — | — | — | — | 0.3 | — | — |
| 19 | 69.5 | 29.7 | — | — | — | — | 0.3 | 0.5 | — |
| 20 | 69.5 | 28.6 | 1.0 | — | — | — | 0.3 | 0.5 | 0.1 |
| 21 | 69.8 | — | 29.9 | — | — | — | 0.3 | — | — |

TABLE 2

| Ceramics | Characteristics | | | | | |
|---|---|---|---|---|---|---|
| | 4-Point Bending Strength Kgf/mm$^2$ | Vickers Hardness (H$_v$) | Critical Stress Intensity Factor MN/m$^{1.5}$ | Rockwell Hardness (H$_{RA}$) | Average Particle size of Matrix μm | Minimum Feed Speed for Chipping mm/min |
| Inventive Composition | | | | | | |
| 1 | 91.7 | 2,020 | 5.6 | 94.1 | 0.8 | 4,500 |
| 2 | 90.2 | 2,070 | 5.8 | 94.4 | 0.7 | 4,600 |
| 3 | 81.9 | 1,980 | 6.0 | 94.0 | 0.9 | 4,800 |
| 4 | 78.0 | 2,130 | 5.5 | 94.8 | 0.8 | 5,200 |
| 5 | 76.4 | 2,160 | 5.5 | 94.9 | 0.8 | 4,700 |
| 6 | 89.1 | 1,970 | 6.1 | 93.9 | 0.7 | 4,600 |
| 7 | 88.6 | 1,960 | 6.0 | 93.8 | 0.7 | 4,300 |
| 8 | 92.0 | 2,010 | 5.8 | 94.1 | 0.7 | 5,700 |
| 9 | 96.3 | 2,000 | 5.7 | 94.1 | 0.7 | 4,500 |
| 10 | 93.5 | 2,010 | 6.0 | 94.1 | 0.7 | 5,300 |
| 11 | 81.0 | 1,960 | 5.6 | 93.9 | 0.8 | 4,400 |
| 12 | 83.3 | 1,940 | 6.3 | 93.7 | 0.8 | 4,000 |
| 13 | 80.6 | 2,020 | 6.0 | 94.2 | 0.8 | 4,800 |
| 14 | 84.1 | 2,000 | 5.8 | 94.0 | 0.8 | 5,100 |
| 15 | 85.0 | 2,050 | 6.1 | 94.3 | 0.7 | 4,100 |
| Comparative Composition | | | | | | |
| 16 | 71.5 | 1,950 | 5.1 | 93.7 | 1.2 | 2,600 |
| 17 | 77.2 | 1,980 | 4.9 | 93.9 | 0.9 | 2,300 |
| 18 | 68.0 | 2,030 | 4.9 | 94.1 | 0.9 | 2,800 |
| 19 | 80.5 | 2,050 | 5.4 | 94.2 | 0.8 | 3,500 |
| 20 | 81.8 | 1,980 | 5.6 | 94.0 | 0.8 | 3,700 |
| 21 | 63.3 | 1,950 | 5.3 | 93.8 | 1.0 | 3,000 |

As evidenced in Table 2, the ceramics of the present invention are improved in bending strength and fracture toughness, exhibiting strengthened toughness and remarkable resistance to chipping.

The super-hard ceramics of the present invention have high strength and high hardness as well as excellent toughness and resistance to chipping. Therefore, they can be used for cutting materials for which conventional alumina ceramics have been difficult to use, as well as for wear-resistant materials which require high precision machining.

Obviously, numerous modifications and variations of the present invention are possible in light of the above teachings. It is therefore to be understood that within the scope of the appended claims, the invention may be practiced otherwise than as specifically described herein.

What is claimed is:

1. A super-hard ceramic consisting essentially of 15-45% by weight of a mixture of titanium carbide and zirconium carbide at a ratio by weight of 1/0.05-1/0.40; 0.1-1.0% by weight of magnesium oxide; 0.05-0.5% by weight of lithium oxide; 0.2-1.0% by weight of neodymium oxide; and 52.5-84.65% by weight of alumina.

2. The super-hard ceramic according to claim 1, wherein less than 50% by weight of zirconium carbide is replaced by one or more of carbides of IVa, Va, and VIa metals in the periodic table other than titanium carbide and zirconium carbide.

* * * * *